(12) United States Patent
Sano

(10) Patent No.: US 6,879,624 B2  
(45) Date of Patent: Apr. 12, 2005

(54) ADAPTIVE ANTENNA RECEIVER

(75) Inventor: Hiroyasu Sano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 123 days.

(21) Appl. No.: 10/450,452

(22) PCT Filed: Nov. 13, 2001

(86) PCT No.: PCT/JP01/09892

§ 371 (c)(1),
(2), (4) Date: Jun. 19, 2003

(87) PCT Pub. No.: WO02/51035

PCT Pub. Date: Jun. 27, 2002

(65) Prior Publication Data

US 2004/0048593 A1 Mar. 11, 2004

(30) Foreign Application Priority Data

Dec. 21, 2000 (JP) ........................ 2000-388890

(51) Int. Cl.[7] .......................... H04B 1/707; H04B 1/26
(52) U.S. Cl. .................... 375/147; 375/347; 375/148; 455/323; 455/334; 455/562; 370/342; 370/335; 342/383; 342/380
(58) Field of Search .................. 375/147, 148, 375/347; 370/335, 342; 455/323, 334, 562; 342/383, 380

(56) References Cited

U.S. PATENT DOCUMENTS 6,385,181 B1 * 5/2002 Tsutsui et al. ............. 370/335
6,509,872 B1 * 1/2003 Ishii et al. ................. 342/383
6,597,678 B1 * 7/2003 Kuwahara et al. ......... 370/342

FOREIGN PATENT DOCUMENTS

| JP | 2000-22612 | 1/2000 |
| JP | 2000-59278 | 2/2000 |
| JP | 2000-82982 | 3/2000 |

OTHER PUBLICATIONS

"Experiments on path search performance of coherent RAKE receiver for W–CDMA mobile radio" Technical Report of IEICE, CS98–30, RCS98–30, pp. 41–48 05/98 (with partial English translation).

"Laboratory experiments on coherent rake receiver in broad-band DS–CDMA mobile radio" Technical Report of IEICE, A.P99–132, RCS99–129, pp. 57–62 10/99 (with partial English translation).

"Experimental evaluation on coherent adaptive array antenna diversity for DS–CDMA reverse link" Technical Report of IEICE, RCS98–94, pp. 33–38 09/98 (with partial English translation).

* cited by examiner

*Primary Examiner*—Temesghen Ghebretinsae  
(74) *Attorney, Agent, or Firm*—Oblon, Spivak, McClelland, Maier & Neustadt, P.C.

(57) ABSTRACT

A path detector detects multipath waves on a transmission line based on a plurality of despread signals corresponding to fixed directional beams. An adaptive beam forming section forms an adaptive beam combined signal for each path, using a weight generated by an adaptive algorithm and the despread signals. An adder combines the adaptive beam signal for all paths, and a data judging section judges data included in the combined signal.

9 Claims, 12 Drawing Sheets

SLOT CONFIGURATION

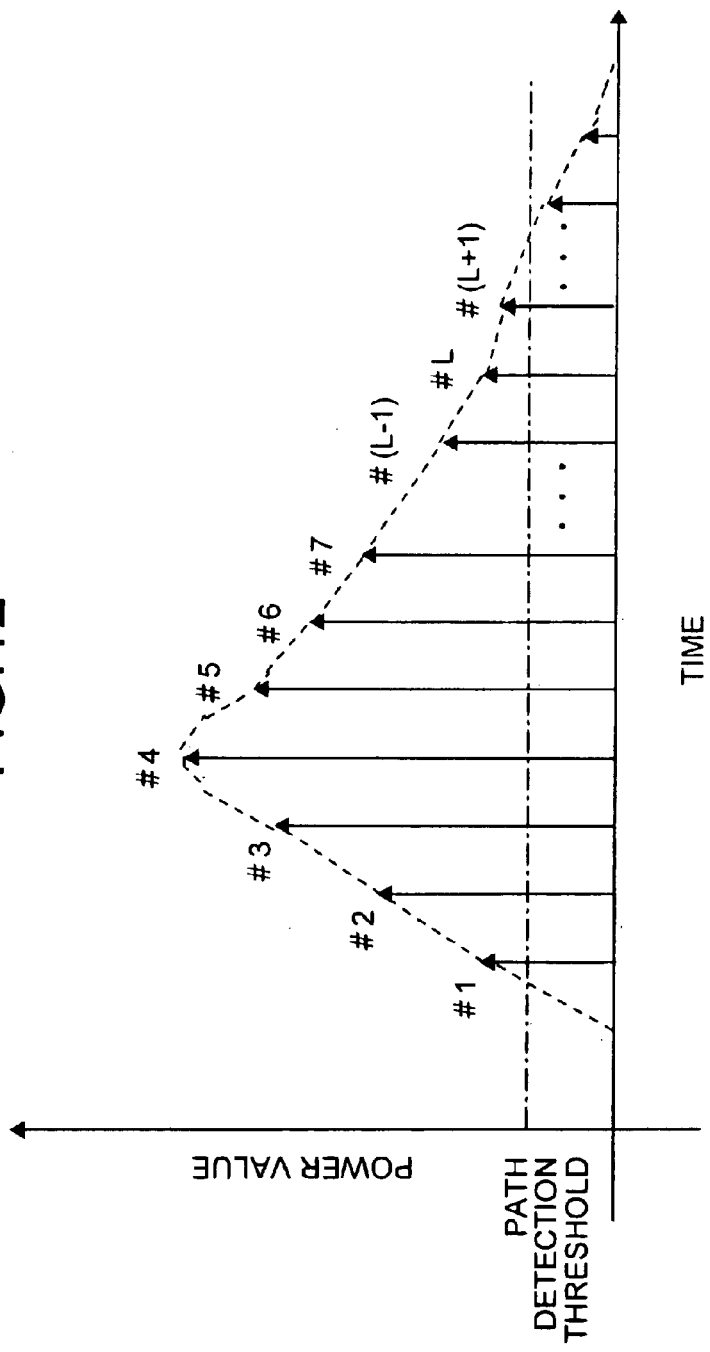

US 6,879,624 B2

1

ADAPTIVE ANTENNA RECEIVER

TECHNICAL FIELD

The present invention relates to an adaptive antenna receiver in a mobile communication system that adopts a code division multiple access (hereinafter, "CDMA") system that uses a spread spectrum modulation system. More specifically, the present invention relates to an adaptive antenna receiver suitable for a transmission line of frequency selective fading, in which multipath waves interfere with each other due to reflection, diffraction, and scattering of radio waves resulting from the surrounding buildings and geographical features.

BACKGROUND ART

A conventional receiver is explained below. Conventional receivers are described, for example, in "Experimental Evaluation on Coherent Adaptive Array Antenna Diversity for DS-CDMA Reverse Link, The Institute of Electronics, Information and Communication Engineers, Technical Report of IEICE, RCS98-94, p. 33–38, September, 1998", and "Laboratory Experiments on Coherent Rake Receiver in Broadband DS-CDMA Mobile Radio, The Institute of Electronics, Information and Communication Engineers, Technical Report of IEICE, CS99-129, p. 57–62, October, 1999".

FIG. 9 shows the configuration of the conventional receiver. In FIG. 9, 201-1, 201-2, . . . 201-N denote N antennas, 202-1, 202-2, . . . , 202-N denote N band-pass filters (hereinafter, "BPF"), 203-1, 203-2, . . . , 203-N denote N despreading sections, 204 denotes a path detector, 205-1, 205-2, . . . , 205-L denote L beam forming sections that receive despread signals affected by multipath waves, to form beams for each path with respect to L paths, 206 denotes an adder, and 207 denotes a data judging section.

In each beam forming section, 221-1, 221-2, . . . , 221-N denote N complex multipliers, 222 denotes a delay device, 223 denotes a weight controller, 224 denotes an adder, 225 denotes a complex multiplier, 226 denotes a complex conjugate calculator, 227 denotes a complex multiplier, 228 denotes a subtracter, and 229 denotes a transmission line estimating section that estimates a transmission line with respect to the individual path.

FIG. 10 shows a detailed configuration of the path detector 204. In the path detector 204, 300 denotes a transmission line estimating section, 301 denotes a mean power value calculator, 302 denotes a threshold calculator, 303 denotes a judging section, and 304 denotes a path selecting section, which detects a plurality of paths from the despread signal.

FIG. 11 shows a format of a transmission slot. The transmission slot comprises a pilot symbol portion (known sequence) and a data portion. FIG. 12 shows one example of impulse response of the transmission line of frequency selective fading. In the mobile communication system, waves (multipath waves) having passed through a plurality of transmission lines arrive due to reflection, diffraction, and scattering of radio-waves resulting from the surrounding buildings and geographical features, and interfere with each other. Here is shown a case in which a signal that has become a multipath wave is input to a reception antenna.

The operation of the conventional receiver is explained next, with reference to FIG. 9 and FIG. 10. Signals from a mobile station received by N antennas 201-1 to 201-N are filtered by the BPFs 202-1 to 202-N, respectively, so that a

2 desired band limitation is applied thereto. The despreading sections 203-1 to 203-N having received the band restricted signals perform despreading, using the same sequence as the spreading code sequence used on the transmission side.

The path detector 204 selects L paths from the despread signals affected by the multipath waves, using one antenna output. Specifically, in the path detector 204, at first, the transmission line estimating section 300 uses a pilot symbol provided for each slot, to perform in-phase addition of all symbols in one slot to thereby obtain a momentary estimate of the transmission line. The mean power value calculator 301 performs power averaging processing over several slots, using the transmission line estimate, to thereby calculate a mean power delay profile. The threshold calculator 302 regards power in the path having the smallest power in the mean power delay profile as noise, and designates power larger by AdB than the power in the path having the smallest power as a threshold for path selection. The judging section 303 compares the mean power delay profile with the threshold, and designates the path having a mean power value larger than the threshold as a multipath with respect to a desired signal, and outputs timewise position information and path power value of the path.

The respective beam forming sections generally perform signal processing with respect to predetermined L paths, due to a limitation in hardware or software. Therefore, in the path detector 204, at the end, the path selecting section 304 selects L effective paths in decreasing order of mean power value. The timewise position of the selected path is output to the respective beam forming sections as the path position information. The despread signals are separated for each path detected by the path detector 204, and transmitted to the beam forming sections 205-1 to 205-L.

The beam forming sections 205-1 to 205-L form beams for each detected path. Here, the beam forming section 205-1 performs the signal processing with respect to the first path, and the beam forming sections 205-2 to 205-N sequentially perform the signal processing with respect to the second to the L-th path.

The operation of the respective beam forming sections is explained in detail below. The weight controller 223 calculates a weight based on the adaptive algorithm such as Least Mean Square (LMS), and the complex multipliers 221-1 to 221-N multiply the signals received from the respective antennas by a complex weight for forming beams. The adder 224 combines the signals output from the complex multipliers to generate a signal after the antenna combine, having directivity.

The transmission line estimating section 229 uses a pilot symbol provided for each slot (see FIG. 11), to calculate a transmission line estimate (complex value) for the first path. The complex conjugate calculator 226 calculates a complex conjugate of the transmission line estimate. The complex multiplier 225 multiplies the complex conjugate by the combined signal output from the adder 224, and outputs a signal weighted in proportion to the signal amplitude, with phase fluctuation being removed.

The adder 206 having received signals from the first to the L-th paths at the same time combines the phase-matched signals for each path. Lastly, the data judging section 207 performs hard judgment with respect to the output from the adder 206, and outputs the result as a demodulation result. Since the demodulation result is used as a reference signal at the time of forming beams for each path, it is branched and transmitted to the respective beam forming sections.

A method of determining a weight for each antenna by the adaptive algorithm is explained below, using the beam forming section 205-1 corresponding to the first path. At first, the complex multiplier 227 performs complex multiplication of the output from the data judging section 207 and the output from the transmission line estimating section 229, to generate the reference signal. The subtracter 228 performs subtraction processing of the output from the complex multiplier 227 and the output from the adder 224, to generate an error signal $e_1^*(k)$ with respect to the first path. Lastly, the weight controller 223 receives the error signal $e_1^*(k)$, and updates the weight as shown in the following equation (1), based on the normalized LMS in the adaptive algorithm:

$$W_1(k+1) = W_1(k) + \mu \frac{X_1(k-\tau)}{\|X_1(k-\tau)\|^2} e_1^*(k) \quad (1)$$

wherein $\|\cdot\|$ denotes a norm, k corresponds to the k-th sampling time ($t=kT_s$: $T_s$ denotes a sampling period), and * denotes a complex conjugate. $X_1(k)$ is a vector expression of the first path of the despread signals received by the respective antennas, and is such that $X_1(k)=[x_1(1, k), x_1(2, k), \ldots, x_1(N, k)]^T$, $W_1(k)$ is a vector expression of the weight for each antenna with respect to the first path, and is such that $W_1(k)=[w_1(1, k), w_1(2, k), \ldots, w_1(N, k)]^T$. The initial value of $W_1(k)$ is $W_1(0)=[1, 0, \ldots, 0]^T$, $\mu$ denotes a step size, and $\tau$ denotes delay time necessary for a series of processing until the signal is input to the weight controller 223.

In the transmission line of frequency selective fading, the conventional receiver improves signal to interference ratio (SIR) relating to a desired signal, using a method in which the adaptive algorithm is used with respect to the path-detected L paths, to form beams separately, and weighting combine (RAKE combine) is performed corresponding to the transmission line estimate, while directing null to the interference signal.

In the conventional receiver, however, since the incoming direction of the multipath from a mobile station to the base station cannot be known, in the initial state before forming the beams by the adaptive array antennas, beams having sharp directivity cannot be formed, and one antenna having broad directivity is used. Therefore, when path detection is performed by one antenna, and when the interference quantity is large, there is a problem in that path detection cannot be performed at high accuracy, corresponding to the signal quality in the path.

In the conventional receiver, from a reason similar to the above, an initial value of the weight is set so as to use one antenna, in the initial state when beams are formed by the adaptive array antennas. In this case, since much time is required for the processing of forming beams based on the adaptive algorithm, on the transmission side of the mobile station, much transmission signal power is required so that the required quality can be satisfied on the reception side of the base station, while signal processing until finishing beam formation is performed on the base station side. Therefore, on the reception side of the base station, the interference power increases momentarily, thereby making it difficult to obtain ideal channel capacity.

In the conventional receiver, it is necessary to prepare one adaptive algorithm for each of the detected L paths, and hence there is a problem in that the hardware size increases.

In the conventional receiver, it is necessary to operate the adaptive algorithm even for a path having a small reception power, if it is the detected path. Therefore, the time required until the adaptive algorithm is settled increases, and hence there is a problem in that the interference power cannot be sufficiently suppressed until the settlement.

It is therefore an object of the present invention to provide an adaptive antenna receiver that can realize highly accurate path detection corresponding to the signal quality in the path and an improvement in reception quality, and can realize a reduction in the hardware and software size.

The adaptive antenna receiver according to one aspect of the present invention comprises a beam forming unit that uses a plurality of antennas to forms beams having fixed directivity; a plurality of despreading units that separately despread a beam signal corresponding to the beams having fixed directivity; a path detecting unit that detects multipath waves on a transmission line based on the signals obtained by despreding, and outputs path position information as a detection result; a transmission line estimating unit that estimates a transmission line for transmitting an adaptive beam combined signal for each path, based on the path position information; a plurality of complex multiplication units each of which separately complex multiplies the despread signals by the transmission line estimation result for each path; an adaptive beam forming unit that generates a weight for each path by operating an adaptive algorithm for each path, using a plurality of complex multiplication results and data judgment results in each path, and forms an adaptive beam combined signal for each path, using the weight and the despread signals; a phase matching unit that performs phase matching corresponding to the transmission line estimated by the transmission line estimating unit, using the adaptive beam signal for each path; a path combining unit that combines the adaptive beam signals after phase matching for all paths; and data judging unit that judges the data included in the adaptive beam signals combined.

The adaptive antenna receiver according to another aspect of the present invention comprises a beam forming unit that uses a plurality of antennas to form beams having fixed directivity; a plurality of despreading units that separately despread a beam signal corresponding to the beams having fixed directivity; a path detecting unit that detects multipath waves on a transmission line based on the signals obtained by despreding, and outputs path position information and predetermined beam selection information necessary for operating the adaptive algorithm as a detection result; a transmission line estimating unit that estimates the transmission line for transmitting an adaptive beam combined signal for each path, based on the path position information; a plurality of complex multiplication units each of which separately complex multiplies the despread signal by the transmission line estimation result for each path; an adaptive beam forming unit that generates a weight common to all paths by operating one adaptive algorithm, using the complex multiplication results, data judgment results, and the beam selection information for all paths, and forms an adaptive beam combined signal for each path, using the weight common to all paths and the despread signals; a phase matching unit that performs phase matching corresponding to the transmission line estimated by the transmission line estimating unit, using the adaptive beam signal for each path; a path combining unit that combines the adaptive beam signals after phase matching for all paths; and a data judging unit that judges the data included in the adaptive beam signals combined.

BRIEF DESCRIPTION OF THE DRAWINGS

FIG. 12 shows one example of impulse response in a transmission line of frequency selective fading.

BEST MODE FOR CARRYING OUT THE INVENTION

Embodiments of the adaptive antenna receiver according to the present invention are explained in detail, with reference to the accompanying drawings. However, the present invention is not limited by those embodiments.

First Embodiment

Figure 1:
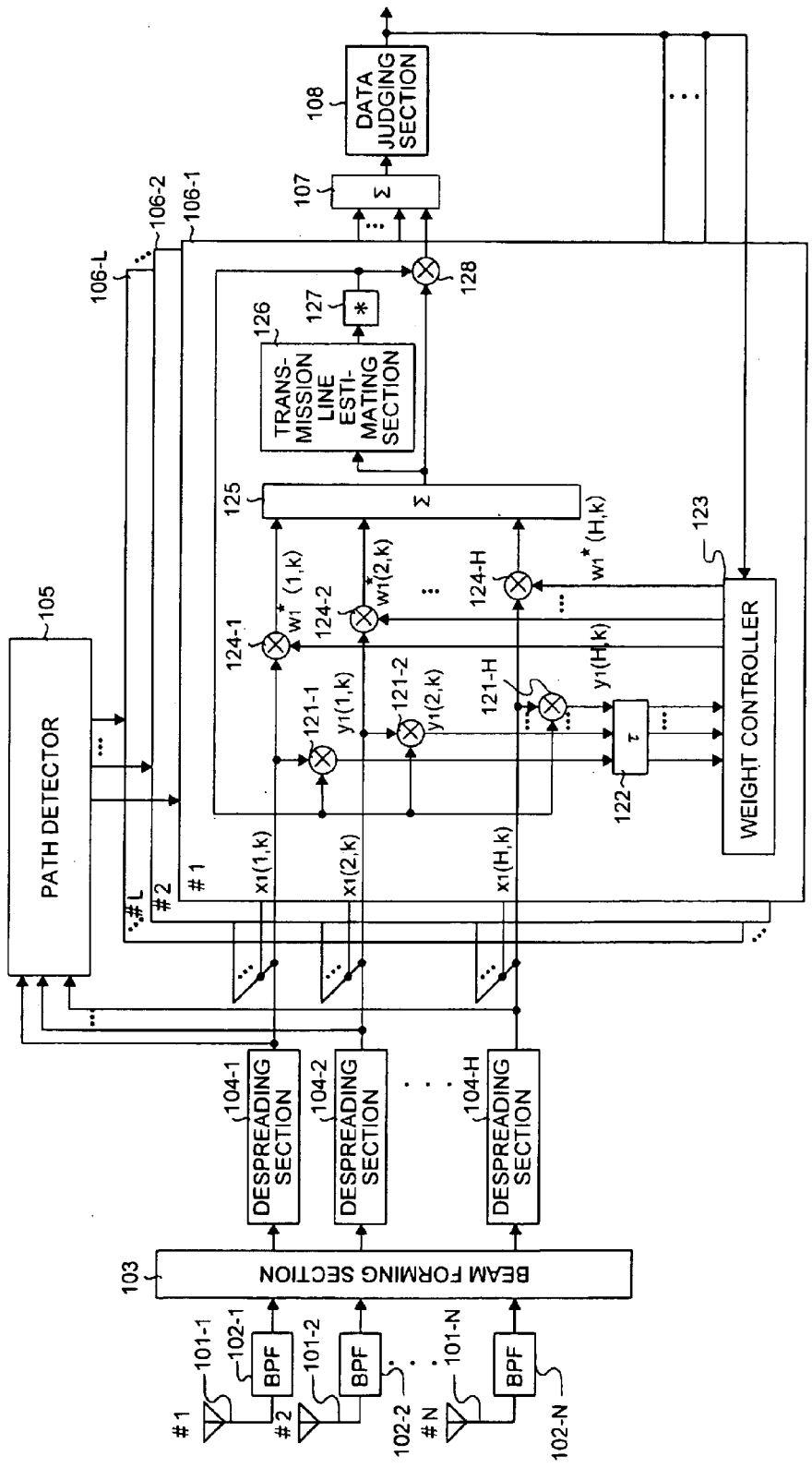
FIG. 1 shows the configuration of a first embodiment of an adaptive antenna receiver according to the present invention.

FIG. 1 shows the configuration of the first embodiment of an adaptive antenna receiver according to the present invention. This embodiment explains an adaptive antenna receiver used in a mobile communication system adopting a CDMA system. It is assumed that the format of the transmission slot has the configuration shown in FIG. 11 described earlier.

Figure 2:
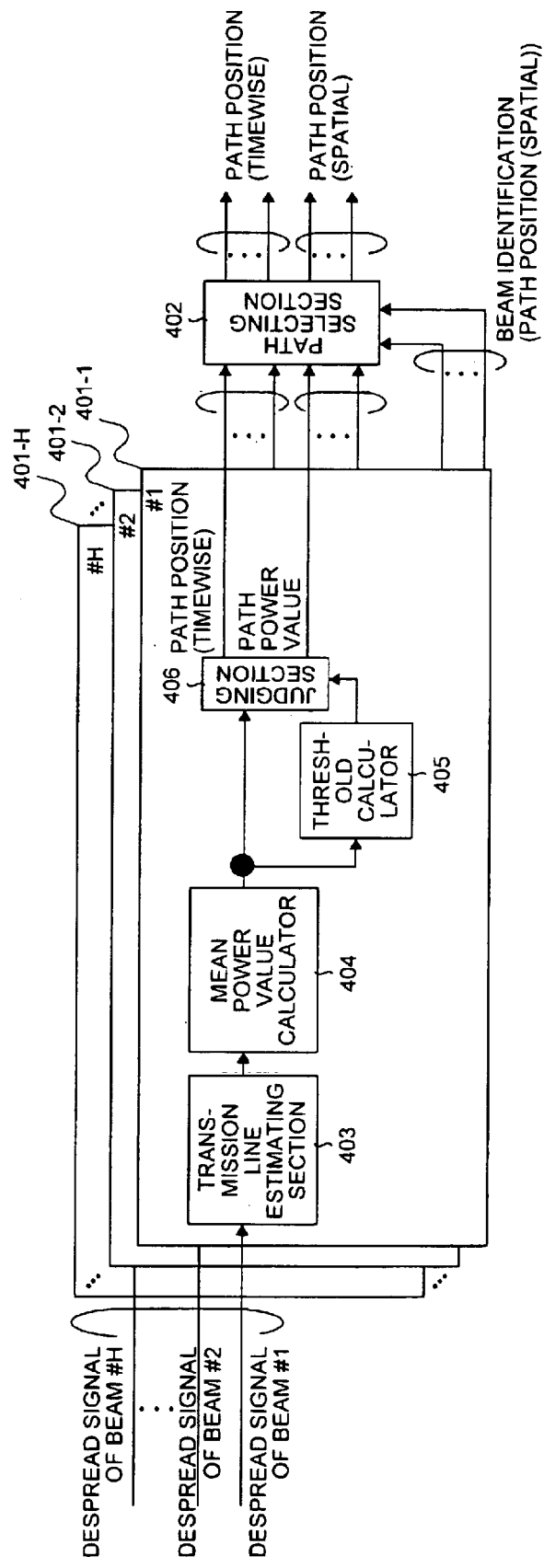
FIG. 2 shows the configuration of a path detector.

In FIG. 1, 101-1, 101-2, . . . , 101-N denote N antennas, 102-1, 102-2, . . . , 102-N denote N BPFs, 103 denotes a beam forming section that forms a plurality of fixed directional beams, 104-1, 104-2, . . . , 104-H denote H despreading sections, 105 denotes a path detector, 106-1, 106-2, . . . , 106-L denote L adaptive beam forming sections that adaptively form beams using an adaptive algorithm for each detected path, 107 denotes an adder, and 108 denotes a data judging section.

In the respective adaptive beam forming section, 121-1, 121-2, . . . , 121-H, and 124-1, 124-2, . . . , 124-H denote complex multipliers, 125 denotes an adder, 126 denotes a transmission line estimating section that estimates a transmission line with respect to the individual path, 127 denotes a complex conjugate calculator, 128 denotes a complex multiplier, 122 denotes a delay device, and 123 denotes a weight controller.

FIG. 2 shows the configuration of the path detector 105. In the path detector 105, 401-1, 401-2, . . . , 401-H denote an beam path detectors for the first, the second, . . . , the H-th beams, 402 denotes a path selecting section that selects a number of paths not exceeding L, from the output of the respective each beam path detectors. The path detector 105 is for detecting a path from a despread signal for each of the first to the H-th fixed beams. In the respective each beam path detector, 403 denotes a transmission line estimating section, 404 denotes a mean power value calculator, 405 denotes a threshold calculator, and 406 denotes a judging section. The configuration of all the beam path detectors is same, and hence the configuration of the each beam path detector 401-1 is taken as an example for explanation.

The operation of the adaptive antenna receiver according to this embodiment is explained in detail, with reference to the drawings. At first, signals from a mobile station received by N antennas 101-1 to 101-N are respectively filtered by the BPFs 102-1 to 102-N, so that a desired band limitation is applied thereto.

Figure 3:
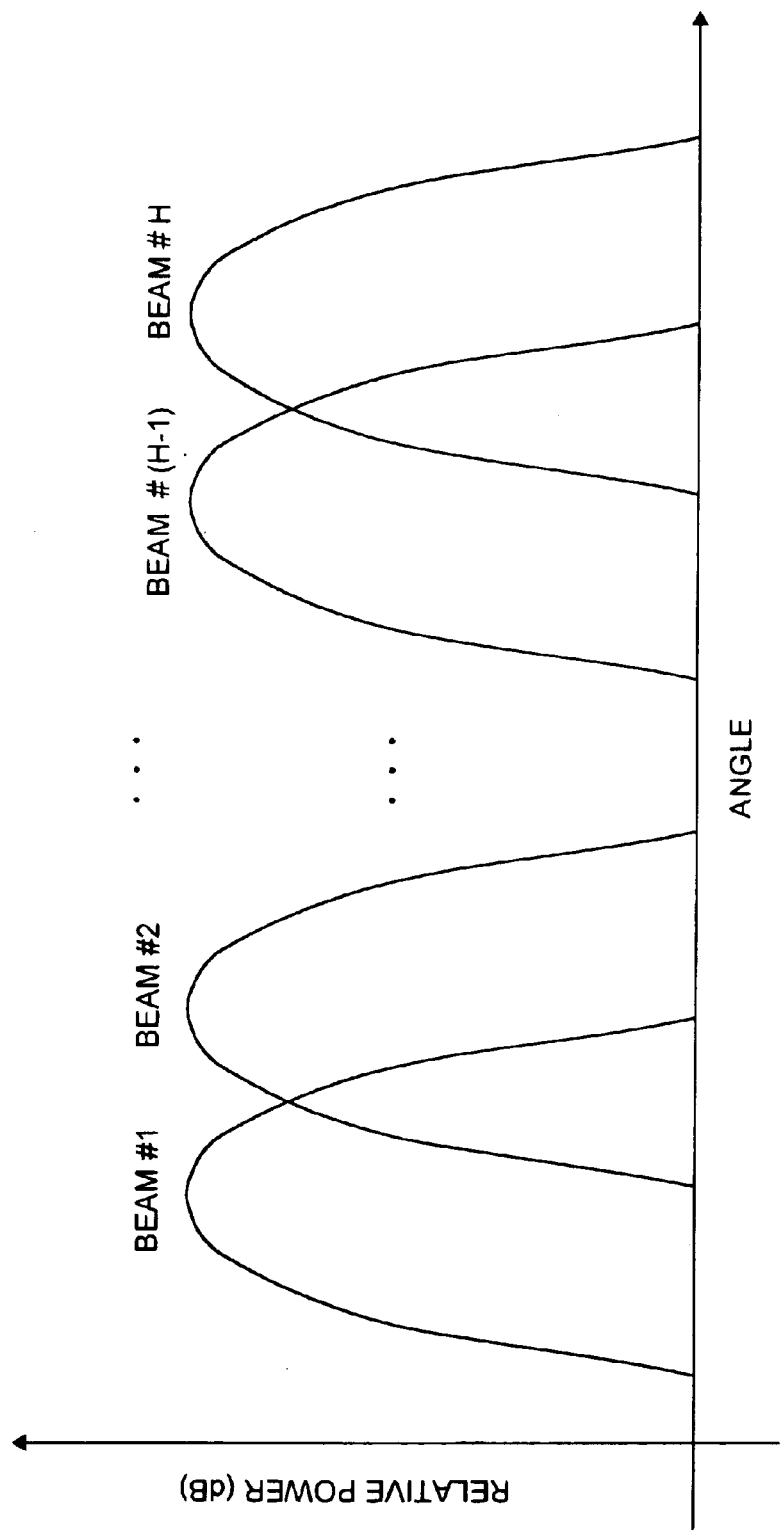
FIG. 3 shows patterns of H fixed beams generated by a beam forming section.

The beam forming section 103 receives the band-restricted signals, to form patterns of H fixed beams. FIG. 3 shows patterns of H fixed beams generated by the beam forming section 103. The despreading sections 104-1 to 104-N despread the signals received in H beams corresponding to the arrival angle from the mobile station by using the same sequence as the spreading code sequence (PN sequence) used on the transmission side.

The path detector 105 detects a path, using the despread signals affected by the multipath waves, and selects a number of paths not exceeding L, having a path position that differs timewise, in decreasing order of path power. Specifically, in the each beam path detector 401-1, the transmission line estimating section 403 in-phase adds all symbols in one slot, using a pilot symbol provided for each slot in the despread signal with respect to beam #1. By this averaging processing, a transmission line estimate in which the influence of noise is reduced can be obtained. The mean power value calculator 404 performs power averaging processing over several slots, using the transmission line estimate output from the transmission line estimating section 403, to calculate a mean power delay profile in predetermined time. The threshold calculator 405 regards power in the path having the smallest power in the mean power delay profile as noise and interference power, and sets power larger than the power in this path by optionally determined ΔdB as a threshold for the path selection. Lastly, the judging section 406 compares the output from the mean power value calculator 404 with the output from the threshold calculator 405, and outputs path position information representing a timewise position of a path exceeding the threshold and the mean power value of this path. In the second and the H-th each beam path detector, signal processing similar to that of the first each beam path detector 401-1 is carried out.

The path selecting section 402 selects a number of paths not exceeding L, in decreasing order of path power, from the paths having different path positions detected by the first to the H-th beams. The path selecting section 402 outputs the spatial and timewise path positions of the selected path to the adaptive beam forming section 106-1 to 106-L, as the path position information.

The operation of the respective adaptive beam forming sections is explained below, taking the adaptive beam forming section 106-1 corresponding to the first path as an example. Since the adaptive beam forming sections corresponding to the second to the L-th paths have the same configuration as that of the adaptive beam forming section 106-1 corresponding to the first path, the explanation thereof is omitted.

The adaptive beam forming section 106-1 receives despread signals $x_i(1, k)$, $x_i(2, k)$, . . . , $x_i(H, k)$ in the first path from the despread signals of H beams, based on the first path position information output from the path detector 105 (however, i means that it is the processing with respect to the i-th path, and i=1 herein).

The complex multipliers 124-1 to 124-H complex multiply weights $w_i^*(1, k)$, $w_i^*(2, k)$, . . . , $w_i^*(H, k)$ of complex values calculated by the weight controller 123 by the despread signal in the first path (however, i means that it is the processing with respect to i-th path, and i=1 herein). The adder 125 adds the outputs from the complex multipliers 124-1 to 124-H, and the addition result becomes a beam signal (adaptive beam combined signal) having directivity.

Figure 11:
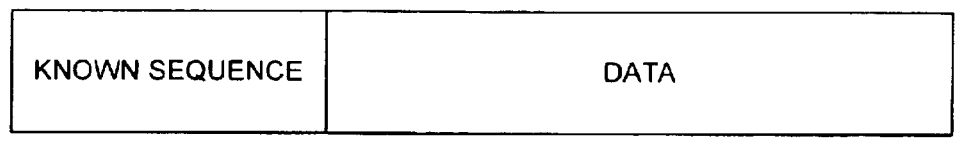
FIG. 11 shows a format of a transmission slot.

The transmission line estimating section 126 calculates a transmission line estimate (complex value) with respect to the first path, using the pilot symbol provided for each slot, shown in FIG. 11.

The complex conjugate calculator 127 calculates a complex conjugate of the transmission line estimate. The complex multiplier 128 multiplies the output from the complex conjugate calculator 127 by the output from the adder 125, and outputs a signal weighted in proportion to the signal amplitude, with phase fluctuation being removed.

The adder 107 receives signal output corresponding to the first path and signal outputs corresponding to the second to the L-th paths output by the same processing, and combines an adaptive beam combined signal phase matched for each path. The data judging section 108 performs hard judgment with respect to the output from the adder 107, and outputs the result as a demodulation result. The demodulation result is branched into individual paths, and transmitted to the adaptive beam forming sections 106-1 to 106-L corresponding to the respective paths.

The output from the complex conjugate calculator 127 is transmitted to the complex multipliers 121-1 to 121-H. The complex multipliers 121-1 to 121-H perform complex multiplication of the despread signals of the first to the H-th beams and the output from the complex conjugate calculator 127, to thereby calculate despread signals $y_i(1, k)$, $y_i(2, k), \ldots, y_i(H, k)$ of the first to the H-th beams, in which a phase fluctuation component due to fading has been removed (however, i means that it is the processing with respect to the i-th path, and i=1 herein). The delay device 122 delays the outputs of the respective complex multipliers 121-1 to 121-H by the processing delay time τ (τ is a delay quantity for each discrete symbol) until the reference signal (that is, data judgment result) required for forming beams is input to the weight controller 123.

The operation of the weight controller 123, that is, the weight determination method for each beam is explained below, taking an example in which sample matrix inversion (hereinafter, "SMI") is used as the adaptive algorithm for forming adaptive beams. The weight controller 123 receives despread signals $y_i(1, k-\tau), y_1(2, k-\tau), \ldots, y_1(H, k-\tau)$ in the first to the H-th beams corresponding to the first path, in which the delay quantity is adjusted, from the delay device 122 (however, k denotes a number of a symbol representing discrete time, and τ denotes a processed delay quantity). Further, the weight controller 123 receives a reference signal d(k−τ), being a demodulation result (it is a complex conjugate, k denotes a number of a symbol representing discrete time, and τ denotes a processed delay quantity), from the data judging section 108.

If the output signal from the delay device 122 is expressed by a vector, the signal vector with respect to the first path becomes $Y_1(k-\tau)=[y_1(1, k-\tau), y_1(2, k-\tau), \ldots, y_1(H, k-\tau)]^T$, and the weight vector of the output from the weight controller 123 with respect to the first path becomes $W_1(k)=[w_1(1, k), w_1(2, k), \ldots, w_1(H, k)]^T$.

Therefore, the weight vector $W_1(k)$ of the first path can be expressed by the following equation (2):

$$W_1(k)=R_{Y1Y1}(k-\tau)^{-1}r_{Y1d}(k-\tau) \qquad (2)$$

wherein $R_{Y1Y1}(k)$ denotes a correlation matrix of the input vector $Y_1(k)$, and $r_{Y1d}(k)$ denotes a correlation vector.

When k−τ<1, or when the transmission frame is not continuously transmitted as at the time of packet transmission, beam forming is performed by setting the weight to 1 with respect to the beam for which a path has been detected, among the first to the H-th beams, and setting the weight to 0 with respect to other beams, as the initial state of the weight vector $W_1(k)$, based on the spatial position information (path detection information) of the path output from the path detector 105. For example, when position information indicating that the first path is detected by the first beam is obtained, the adaptive beam forming section 106-1 corresponding to the first path sets $W_1(k)=[1, 0, \ldots, 0]^T$, as the weight vector with respect to the first path.

The correlation matrix $R_{Y1Y1}(k)$ can be expressed by the following equation (3):

$$R_{Y1Y1}(k-\tau) = \frac{1}{m}\sum_{i=1}^{m} Y_1(k-\tau)Y_1^H(k-\tau-i) \qquad (3)$$

wherein $H$ denotes a sign expressing complex conjugate transposition.

The correlation vector $r_{Y1d}(k)$ with respect to the first path can be expressed by the following equation (4):

$$r_{Y1d}(k-\tau) = \frac{1}{m}\sum_{i=1}^{m} Y_1(k-\tau-i)d^*(k-\tau-i) \qquad (4)$$

wherein * denotes a complex conjugate.

Beams are then formed by the adaptive algorithm, using the weight vector $W_1(k)$ in the first path obtained by the equation (2). Here, calculation is performed recursively, according to the algorithm shown below, including the correlation vector $r_{Y1d}(k)$, in order to simplify the inversion of the correlation matrix $R_{Y1Y1}(k)$.

The correlation vector $r_{Y1d}(k)$ can be calculated by the following equation (5):

$$r_{Y1d}(1)=Y_1(1)d^*(1)$$
$$r_{Y1d}(k)=\beta r_{Y1d}(k-1)+(1-\beta)Y_1(k)d^*(k)$$
$$k=2, 3, \qquad (5)$$

wherein β is a real number parameter satisfying 0<β<1, for controlling the time constant for estimation.

The correlation matrix $R_{Y1Y1}(k)$ can be calculated from the following equation (6):

$$R_{Y1Y1}^{-1}(k) = \qquad (6)$$
$$\frac{1}{\beta}R_{Y1Y1}^{-1}(k-1) - \frac{(1-\beta)R_{Y1Y1}^{-1}(k-1)Y_1(k)Y_1^H(k)R_{Y1Y1}^{-1}(k-1)}{\beta^2+\beta(1-\beta)Y_1^H(k)R_{Y1Y1}^{-1}(k-1)Y_1(k)}$$
$$k=2, 3, \ldots$$

Therefore, based on the above equations (5) and (6), after phase matching $R_{Y1Y1}^{-1}(k-\tau)$ and $r_{Y1d}(k-\tau)$ are calculated, the calculation result is substituted in the equation (2), thereby the weight vector $W_1(k)$ with respect to the first path can be calculated.

In this embodiment, an example in which the adaptive algorithm of SMI is used for determining the weight for forming the beams has been explained, but the adaptive algorithm is not limited to SMI, and for example, a known adaptive algorithm such as RLS or LMS may be used.

In this embodiment, at the time of detecting the path, a plurality of beams having predetermined directivity is used to cover the serviceable area, and path detection is carried out for each of the fixed directional beams. As a result, even when the interference quantity is large in the area to be serviced, interference power for each of the fixed directional beams can be suppressed, and hence the path detection can be carried out accurately.

In this embodiment, further, the adaptive algorithm is operated by using predetermined fixed directional beams. As a result, the interference quantity for each beam can be reduced, to increase the SIR. Therefore, the adaptive beams to be formed by the adaptive algorithm can be formed quickly.

In this embodiment, the adaptive beam combined signal phase matched for each path is used, and the adaptive algorithm is utilized, to form the adaptive beams for each path. As a result, the communication quality can be improved, while the fading fluctuation and the influence of interference received in the area to be serviced are reduced.

In this embodiment, when the weight is in the initial state, or when transmission is not carried out continuously, as at the time of packet transmission, and when the adaptive algorithm of the adaptive antenna is in the initial state, the path detected for each of the fixed directional beams is weighted according to the signal level, and then combined. As a result, the time required until the beam is formed, and the adaptive algorithm is settled can be reduced, and the communication quality can be improved, while the influence of interference received in the area to be serviced is reduced.

Second Embodiment

In this embodiment, in addition to the configuration of the first embodiment, an interference quantity estimating section, and a normalizing section that performs normalization, using the interference quantity calculated by the interference quantity estimating section are provided. The operation that is different from the first embodiment is only explained here, for the brevity of explanation.

Figure 4:
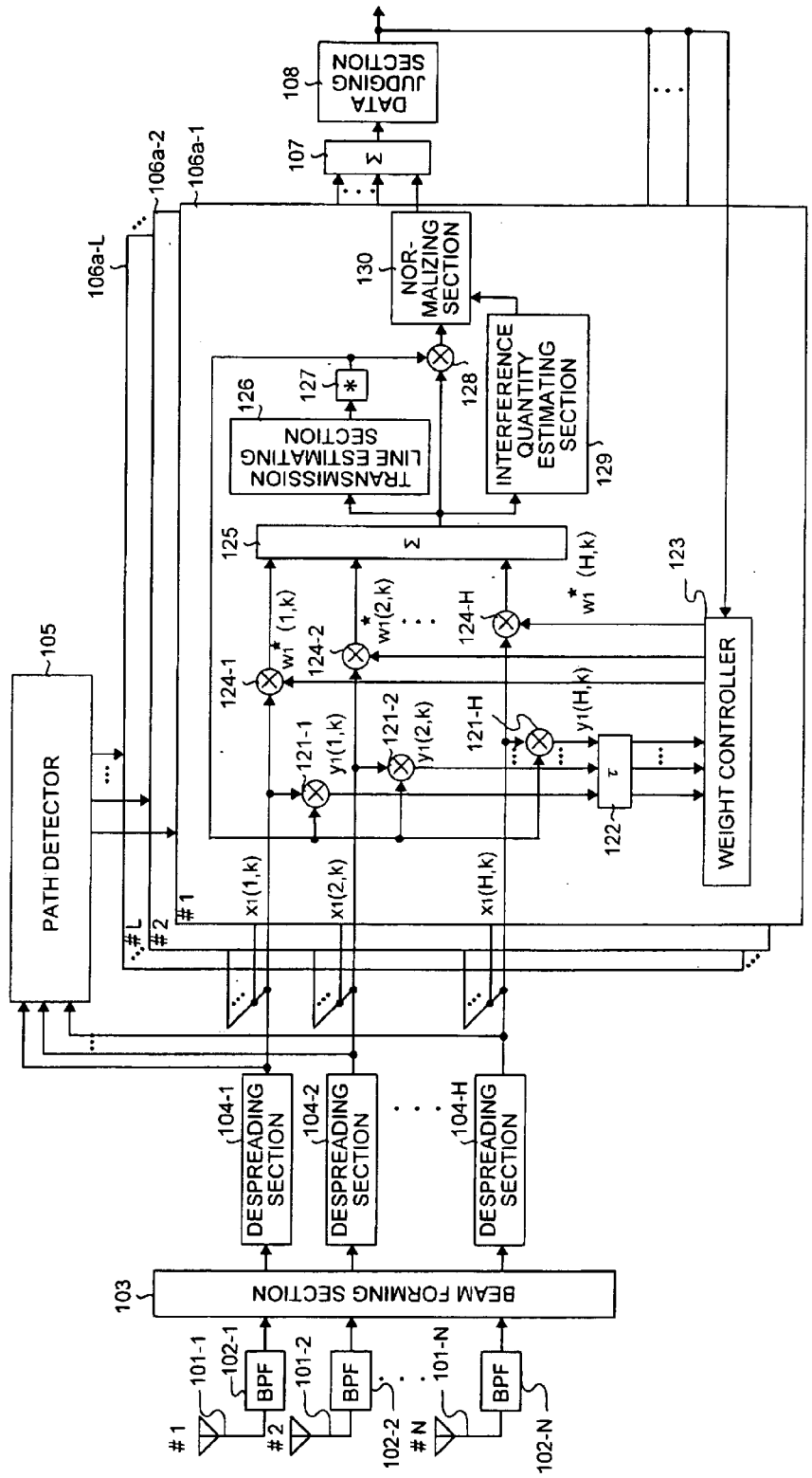
FIG. 4 shows the configuration of a second embodiment of the adaptive antenna receiver according to the present invention.

FIG. 4 shows the configuration of a second embodiment of the adaptive antenna receiver according to the present invention. The operation of the interference quantity estimating section and the normalizing section is explained here. The format of the transmission slot is the same as the one shown in FIG. 11. The components that are same as those in the first embodiment are denoted by the same reference sign, and the explanation thereof is omitted.

In FIG. 4, 106a-1, 106a-2, . . . , 106a-L denote L adaptive beam forming sections that adaptively form beams using the adaptive algorithm, 129 denotes an interference quantity estimating section, and 130 denotes a normalizing section.

Only the operation of the adaptive beam forming section 106a-1 corresponding to the first path is explained below, for the brevity of explanation. The interference quantity estimating section 129 in-phase adds the pilot symbol $P_s(k_s, j)$ in the $k_s$-th slot for all symbols, in order to calculate the interference quantity from the output $Z_1(k_s, j)$ ($k_s$ denotes a slot, and j denotes a j-th pilot symbol in the $k_s$-th slot) of the adder 125, being the adaptive beam combined signal formed with respect to the first path (however, $|P_s(k_s, j)|=1$), to calculate a transmission line estimate $\eta_1(k_s)$ with respect to the $k_s$-th slot in the first path (however, $\eta_1(k_s)$ is a complex number). In other words, the interference quantity estimating section 129 calculates an interference quantity $\sigma_1^2(k_s)$ of the $k_s$-th slot with respect to the adaptive beam combined signal in the first path, as shown in the following equation (7), using the transmission line estimate $\eta_1(k_s)$ and the adaptive beam combined signal $Z_1(k_s, j)$ with respect to the first path.

$$\sigma_1^2(k_s) = \frac{1}{P}\sum_{j=1}^{P} |Z_1(k_s, j) \cdot P_s^*(k_s, j) - \eta_1(k_s)|^2 \quad (7)$$

wherein $P_s^*(k_s, j)$ is a complex conjugate of $P_s(k_s, j)$, and P denotes the number of pilot symbols in one slot.

The interference quantity estimating section 129 averages the obtained interference quantity $\sigma_1^2(k_s)$ over a plurality of slots, according to the equation (8), to calculate an interference quantity estimate $I_1(k)$ of the $k_s$-th slot in the adaptive beam combined signal in the first path.

$$I_1(k_s) = \frac{1}{S}\sum_{i=0}^{S-1} \sigma_1^2(k_s - S) \quad (8)$$

wherein S denotes the number of slots used for averaging.

After phase matching, the normalizing section 130 having received the output of the interference quantity estimating section 129 and the output of the complex multiplier 128 generates the adaptive beam combined signal in the first path normalized by the interference quantity, by dividing the output of the complex multiplier 128 by the output of the interference quantity estimating section 129.

In this embodiment, when a mobile station having a different transmission signal power exists, because the position of the mobile station is unevenly distributed momentarily, or the transmission rate is different, and hence the interference power for each beam formed by the adaptive array antennas cannot be regarded as the same, weighting is performed corresponding to the interference quantity, and then the adaptive beam combined signals for each path are combined. As a result, the same effect as that of the first embodiment can be obtained, and the reception SIR can be maximized, and hence ideal channel capacity can be obtained.

Third Embodiment

In this embodiment, the input signal to the weight controller is for the number of fixed directional beams, and the weight generated by the weight controller is applied to all paths. In other words, there is one weight controller on the receiver side in the base station with respect to each mobile station. Here, only the operation different from that of the first embodiment is explained.

Figure 5:
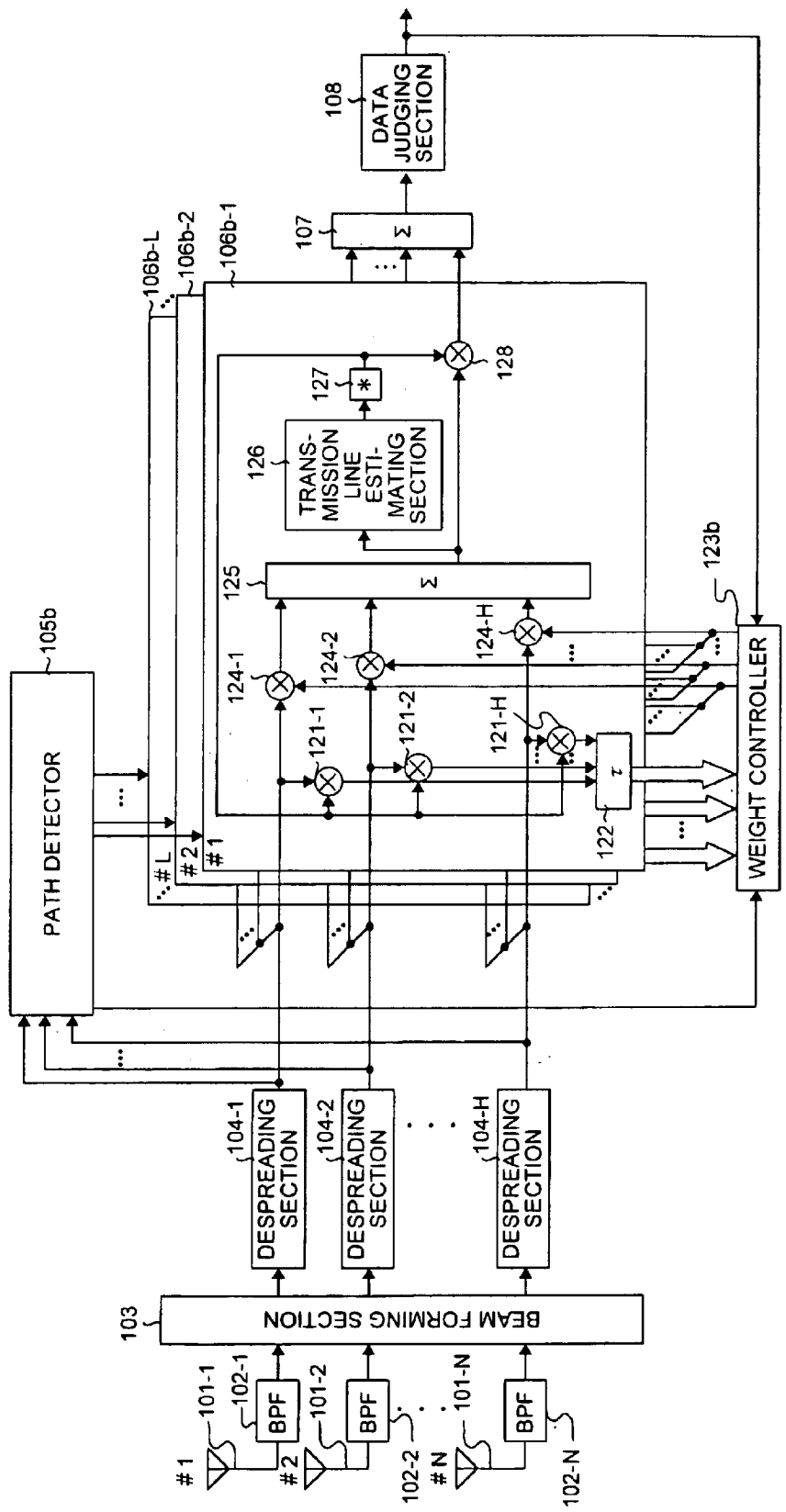
FIG. 5 shows the configuration of a third embodiment of the adaptive antenna receiver according to the present invention.

FIG. 5 shows the configuration of the third embodiment of the adaptive antenna receiver according to the present invention. The construction in FIG. 11 is used for the format of the transmission slot, as in the first embodiment. The component same as that in the first embodiment is denoted by the same reference sign, and the explanation thereof is omitted.

In FIG. 5, 105b denotes a path detector, and 106b-1, 106b-2, . . . , 106b-L denote adaptive beam forming sections that adaptively forms beams, using the adaptive algorithm, for each of the detected paths, and 123b denotes a weight controller.

Figure 6:
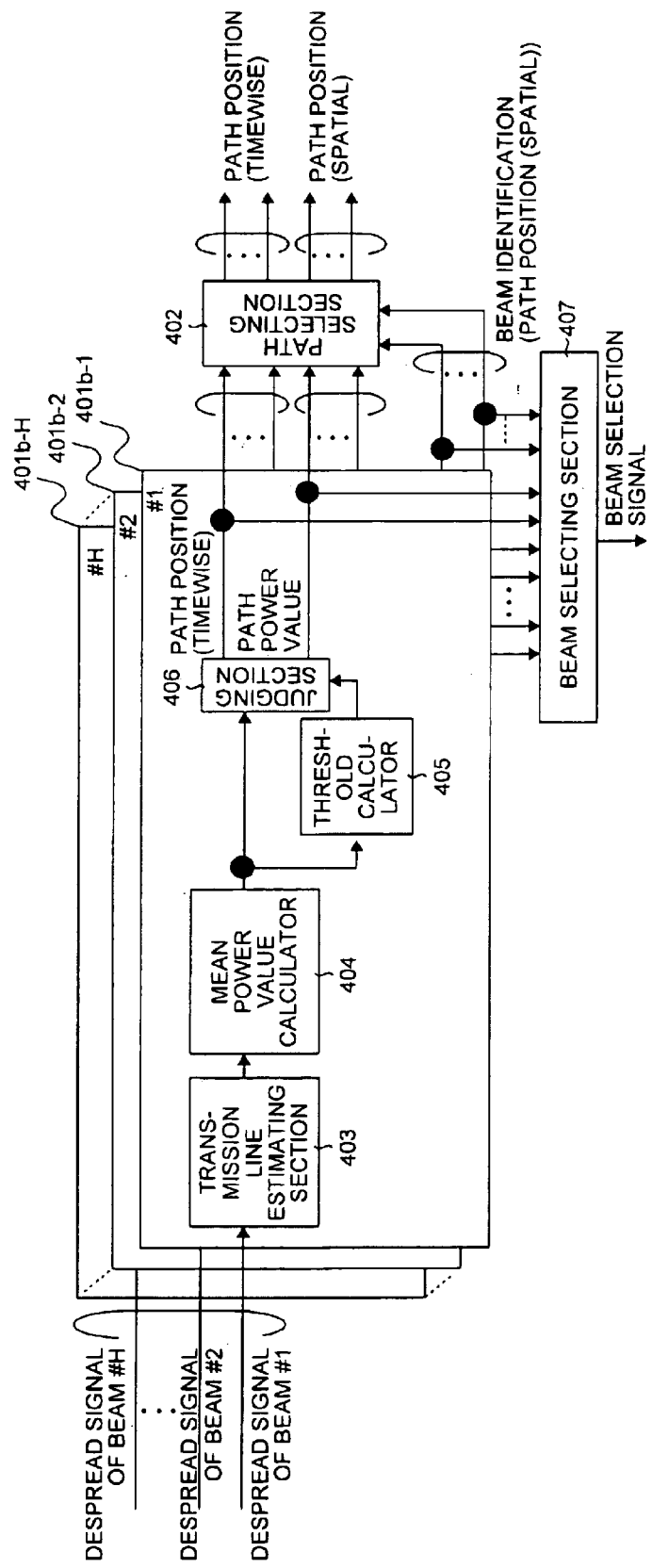
FIG. 6 shows the configuration of a path detector.

FIG. 6 shows the configuration of the path detector 105b. In FIG. 6, 401b-1, 401b-2, . . . , 401b-H respectively denote an each beam path detector in the first, the second, . . . , and the H-th beams, 402 denotes a path selecting section, and 407 denotes a beam selecting section that selects a beam having the best reception condition from a plurality of fixed beams. The path detector 105b detects a path from the despread signals for each of the first to the H-th fixed beams, and selects a beam having the best reception condition.

The operation of the adaptive antenna receiver in this embodiment is explained in detail, with reference to the drawings. Only the operations that are different from those of the first embodiment are explained here. In the path detector 105b, the beam selecting section 407 calculates the sum total of path power for each beam, by using the information relating to the path position (timewise), the path position (spatial), and the path power value, in addition to the operation in the first embodiment, and selects a beam having the largest sum total of the path power, and then outputs the beam selection result to the weight controller 123b.

The operation of the adaptive beam forming section 106b-1 corresponding to the first path and the weight controller 123b is explained below. The adaptive beam forming sections corresponding to the second to the L-th paths have the same configuration as that of the adaptive beam forming section 106b-1, and hence the explanation thereof is omitted. Further, only the operation different from that of the first embodiment is explained here.

The adaptive beam forming section 106b-1 receives despread signals $x_i(1, k), x_i(2, k), \ldots, x_i(H, k)$ in the first path from the despread signals of H beams, based on the first path position information output from the path detector 105b.

The complex multipliers 124-1 to 124-H complex multiply weights $w(1, k), w(2, k), \ldots, w(H, k)$ of complex values common to all paths calculated by the weight controller 123b by the despread signal in the first path. The adder 125 adds the outputs from the complex multipliers 124-1 to 124-H, and the addition result becomes a beam signal (adaptive beam combined signal) having directivity.

The transmission line estimating section 126 calculates a transmission line estimate (complex value) with respect to the first path, using the pilot symbol provided for each slot, shown in FIG. 11. The complex conjugate calculator 127 calculates a complex conjugate of the transmission line estimate. The complex multiplier 128 multiplies the output from the complex conjugate calculator 127 by the output from the adder 125, and outputs a signal weighted in proportion to the signal amplitude, with phase fluctuation being removed.

The adder 107 receives signal output corresponding to the first path and signal outputs corresponding to the second to the L-th paths output by the same processing, and combines an adaptive beam combined signal phase matched for each path. The data judging section 108 performs hard judgment with respect to the output from the adder 107, and outputs the result as a demodulation result. The demodulation result is transmitted to the weight controller 123b as a reference signal.

The output from the complex conjugate calculator 127 is transmitted to the complex multipliers 121-1 to 121-H. The complex multipliers 121-1 to 121-H perform complex multiplication of the despread signals of the first to the H-th beams and the output from the complex conjugate calculator 127, to thereby calculate despread signals $y_i(1, k), y_i(2, k), \ldots, y_i(H, k)$ of the first to the H-th beams, in which a phase fluctuation component due to fading has been removed (however, i means that it is the processing with respect to the i-th path, and i=1 herein). The delay device 122 delays the outputs of the respective complex multipliers 121-1 to 121-H by the processing delay time $\tau$ ($\tau$ is a delay quantity for each discrete symbol) until the reference signal (that is, data judgment result) required for forming beams is input to the weight controller 123b. The delay time of the first to the H-th beam signals after phase matching the complex multiplication, which has been delayed for each path, received by the weight controller 123b is matched, so as to be input at an accuracy of symbol timing.

The operation of the weight controller 123b, that is, the weight determination method for each beam is explained below, taking an example in which SMI is used as the adaptive algorithm for forming adaptive beams. The weight controller 123b receives despread signals $y_i(1, k-\tau), y_1(2, k-\tau), \ldots, y_i(H, k-\tau)$ in the first to the H-th beams corresponding to the first path, in which the delay quantity is adjusted, from the delay device 122 (however, k denotes a number of a symbol representing discrete time, and $\tau$ denotes a processed delay quantity). Further, the weight controller 123b receives a reference signal $d(k-\tau)$, being a demodulation result (it is a complex conjugate), from the data judging section 108.

The signal vector with respect to the first path becomes $Y_i(k-\tau)=[y_i(1, k-\tau), y_i(2, k-\tau), \ldots, y_i(H, k-\tau)]^T$, and the weight vector of the output from the weight controller 123b with respect to all paths becomes $W(k)=[w(1, k), w(2, k), \ldots, w(H, k)]^T$.

Therefore, the weight vector $W_1(k)$ of the first path can be expressed by the following equation (9):

$$W(k)=R_{YY}(k-\tau)^{-1}r_{Yd}(k-\tau) \tag{9}$$

wherein $R_{YY}(k)$ denotes a correlation matrix of a signal obtained by combining the signal vector $Y_i(k)$ in each path, as shown in the following equation (10):

$$R_{YY}(k-\tau) = \frac{1}{mL}\sum_{j=1}^{L}\sum_{i=1}^{m} Y_j(k-\tau)Y_j^H(k-\tau-i) \tag{10}$$

wherein L denotes the number of paths $r_{Yd}(k)$ denotes a correlation vector of a signal obtained by combining the signal vector $Y_i(k)$ in each path, as shown in the following equation (11):

$$R_{YY}(k-\tau) = \frac{1}{mL}\sum_{j=1}^{L}\sum_{i=1}^{m} Y_j(k-\tau)Y_j^H(k-\tau-i) \tag{11}$$

When $k-\tau<1$, or when the transmission frame is not continuously transmitted as at the time of packet transmission, beam forming is performed by setting the weight to 1 with respect to the beam having the largest sum total of the path power, among the first to the H-th beams, and setting the weight to 0 with respect to other beams, as the initial state of the weight vector W(k), based on the beam selection signal output by the path detector 105b. For example, when the beam selection signal indicating that the sum total of the path power of the first beam is the largest is obtained, the weight controller 123b sets $W(k)=[1, 0, \ldots, 0]^T$, as the weight vector.

Further, beam formation by the adaptive algorithm is carried out, using the weight vector W(k) obtained by the equation (9). Here, calculation processing is performed recursively, according to the algorithm shown below, including the correlation vector $r_{Yd}(k)$, in order to simplify the inversion of the correlation matrix $R_{YY}(k)$. The correlation vector $r_{Yd}(k)$ can be calculated by the following equation (12):

$$r_{Yd}(1) = \sum_{j=1}^{L} Y_j(1)d^*(1) \tag{12}$$

$$r_{Yd}(k) = \beta r_{Yd}(k-1) + (1-\beta)\sum_{j=1}^{L} Y_j(k)d^*(k)$$

wherein $\beta$ is a real number parameter satisfying $0<\beta<1$, for controlling the time constant for estimation.

The correlation matrix $R_{YY}(k)$ can be calculated from the following equation (13):

$$R_{YY}^{-1}(k) = \frac{1}{\beta} R_{YY}^{-1}(k-1) - \quad (13)$$

$$\frac{(1-\beta)R_{YY}^{-1}(k-1)\sum_{j=1}^{L} Y_j(k) \cdot \sum_{j=1}^{L} Y_j^H(k) \cdot R_{YY}^{-1}(k-1)}{\beta^2 + \beta(1-\beta)\sum_{j=1}^{L} Y_j^H(k) \cdot R_{YY}^{-1}(k-1)\sum_{j=1}^{L} Y_j(k)}$$

$$k = 2, 3, \ldots$$

Therefore, based on the above equations (12) and (13), after phase matching $R_{YY}^{-1}(k-\tau)$ and $r_{Y1d}(k-\tau)$ are calculated, the calculation result is substituted in the equation (9), thereby the weight vector W(k) can be calculated.

In this embodiment, an example in which the adaptive algorithm of SMI is used for determining the weight for forming the beams has been explained, but the adaptive algorithm is not limited to SMI, and for example, a known adaptive algorithm such as RLS or LMS may be used.

In this embodiment, a signal obtained by combining the adaptive beam combined signals phase matched for each path over all paths is used, to generate a weight common to all paths by using the adaptive algorithm. Thereby, on the reception side of the base station, one adaptive algorithm corresponding to the number of fixed directional beams needs only to be prepared. As a result, the size of hardware and software can be considerably reduced.

In this embodiment, when the weight is in the initial state, or when transmission is not carried out continuously, as at the time of packet transmission, and when the adaptive algorithm of the adaptive antenna is in the initial state, the adaptive algorithm is operated by selecting a beam having the largest sum total of path power from the fixed directional beams. As a result, the time until the adaptive algorithm is settled can be reduced, and the communication quality can be considerably improved, while the interference quantity in the area to be serviced is reduced.

Fourth Embodiment

In addition to the third embodiment, this embodiment corresponds to a case in which there exists a path whose incoming direction is largely different spatially. Specifically, a combination of the adaptive beam forming sections 106b-1 to 106b-L, the weight controller 123b, and the adder 107 is provided for a plurality of groups. Here, only the operation different from that of the third embodiment is explained.

Figure 7:
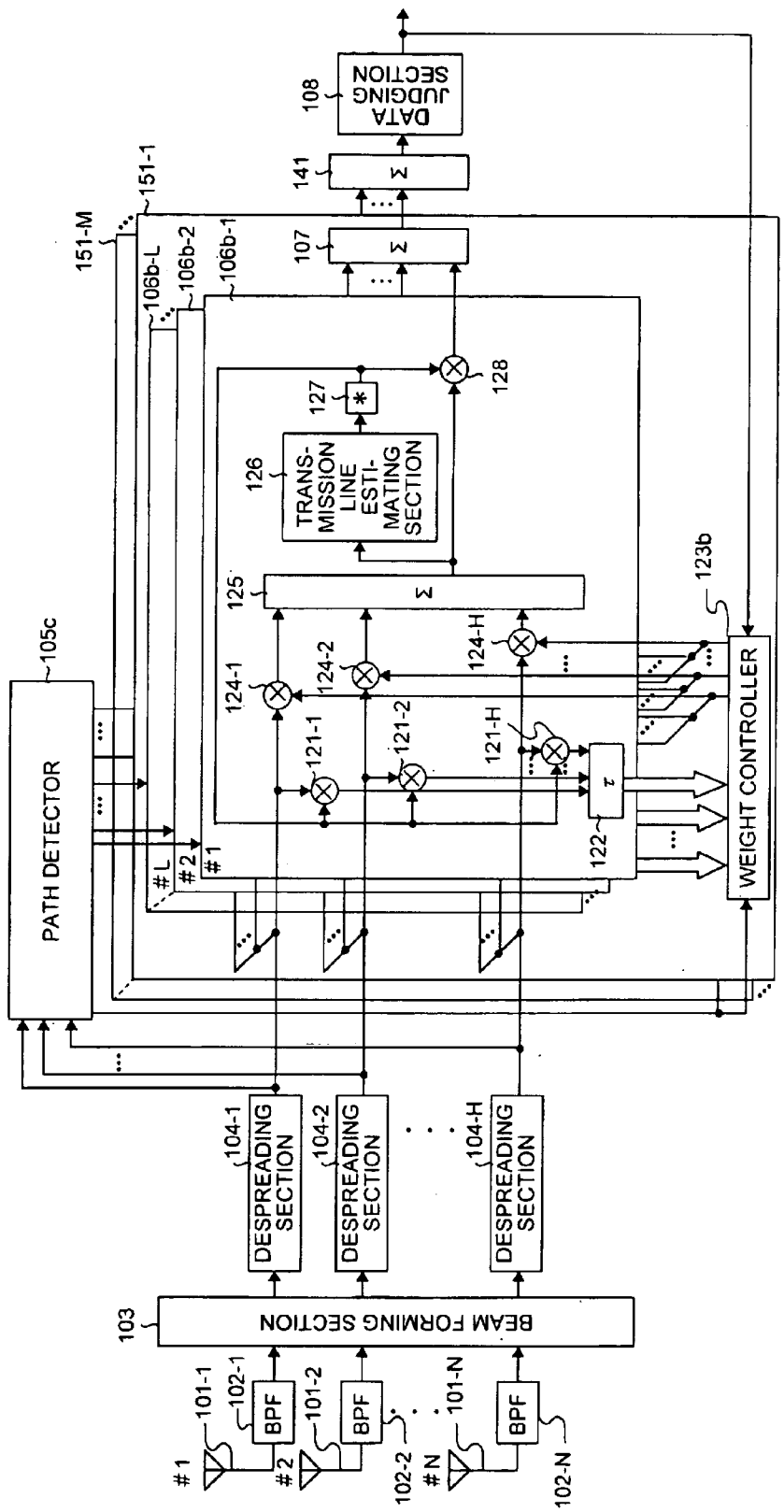
FIG. 7 shows the configuration of a fourth embodiment of the adaptive antenna receiver according to the present invention.

FIG. 7 shows the configuration of the fourth embodiment of the adaptive antenna receiver according to the present invention. The construction in FIG. 11 is used for the format of the transmission slot, as in the first to the third embodiments. The component same as that in the third embodiment is denoted by the same reference sign, and the explanation thereof is omitted.

In FIG. 7, 105c denotes a path detector having the same function as the path detector 105 described above, 141 denotes an adder, and 151-1 to 151-M denote an adaptive beam forming group formed of a combination of the adaptive beam forming sections 106b-1 to 106b-L, the weight controller 123b, and the adder 107.

The operation of the adaptive antenna receiver in this embodiment is described below in detail, with reference to the drawings. Here, only the operation different from that of the third embodiment is explained. For example, a path is detected in two or more fixed beams by the path selecting section 402 shown in FIG. 6, and a plurality of adaptive beam forming groups are provided so as to correspond to an individual path, with respect to paths different spatially such that the path position exceeds the adjacent fixed directional beams, to thereby form adaptive beams adaptively.

The outputs of the adaptive beam forming groups are added in the adder 141, and the addition result is output to the data judging section 108.

As described above, in this embodiment, when the path detection position is largely different spatially, an adequate adaptive beam is formed for each group of paths detected at close positions spatially. As a result, the similar effect to that of the third embodiment can be obtained, and adaptive beams can be formed without increasing the number of weight controllers that execute the adaptive algorithm.

Fifth Embodiment

This embodiment corresponds to a case in which there exists a path whose incoming direction is largely different spatially, with processing different from the third embodiment. Specifically, a combination of the adaptive beam forming sections 106d-1 to 106d-L (application example of the second embodiment), the weight controller 123b, and the adder 107 is provided for a plurality of groups. Here, only the operation different from that of the fourth embodiment is explained.

Figure 8:
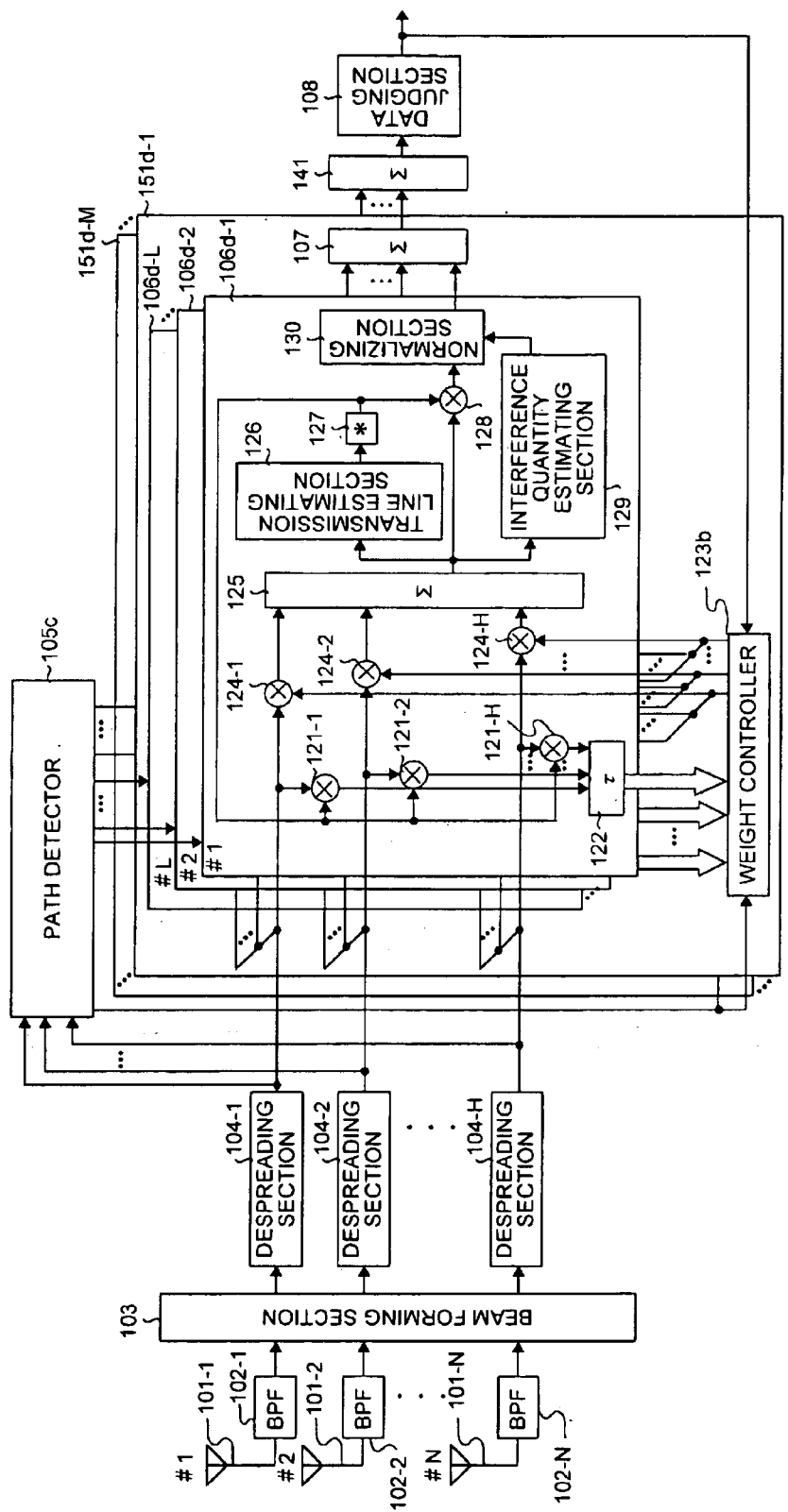
FIG. 8 shows the configuration of a fifth embodiment of the adaptive antenna receiver according to the present invention.
Figure 9:
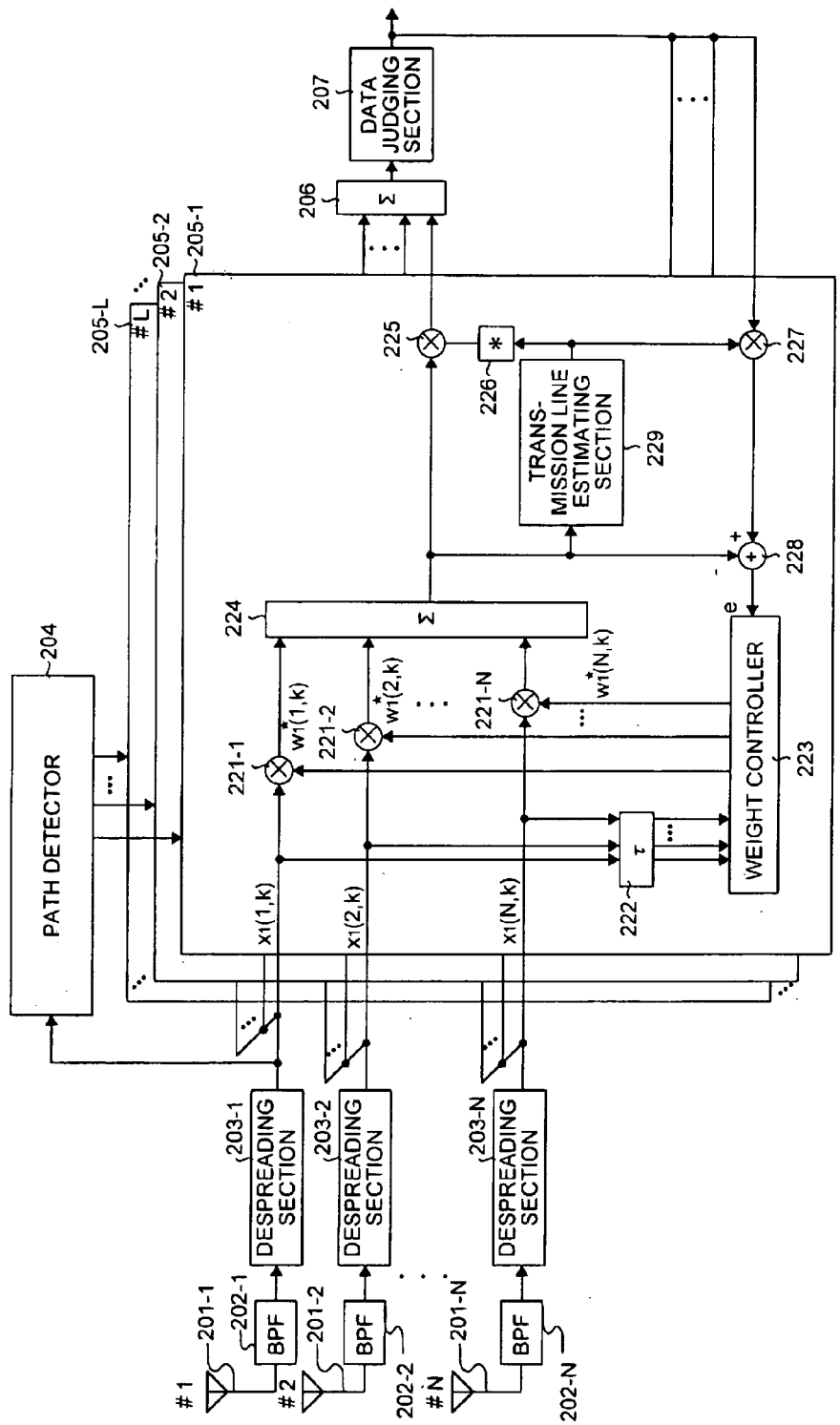
FIG. 9 shows the configuration of a conventional receiver.
Figure 10:
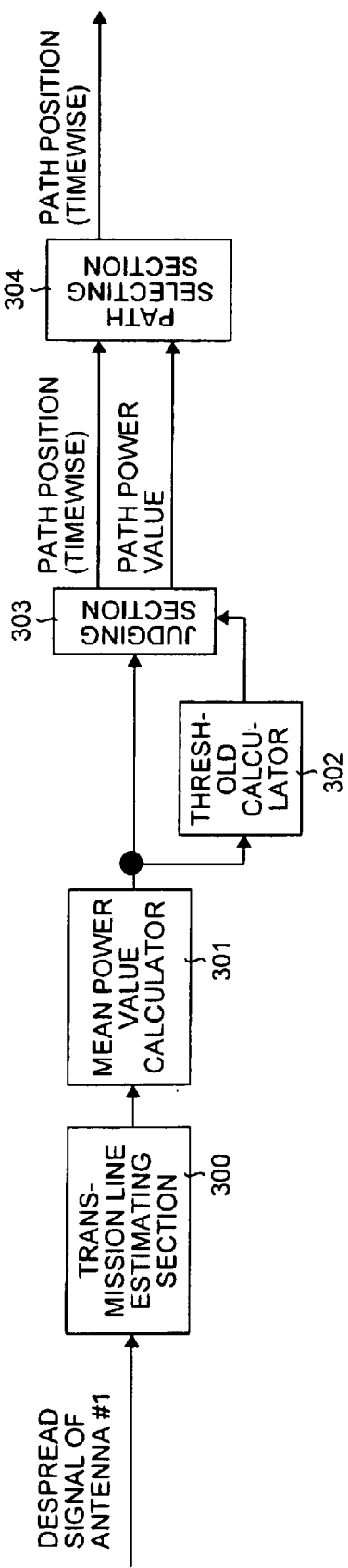
FIG. 10 shows the configuration of a conventional path detector.

FIG. 8 shows the configuration of the fifth embodiment of the adaptive antenna receiver according to the present invention. The construction in FIG. 11 is used for the format of the transmission slot, as in the first to the fourth embodiments. The component same as that in the first to fourth embodiments is denoted by the same reference sign, and the explanation thereof is omitted.

In FIG. 8, 106d-1, 106d-2, . . . , 106d-L denote an adaptive beam forming section that adaptively forms beams, using the adaptive algorithm for each of the detected paths, and 151d-1 to 151d-M denote an adaptive beam forming group formed of a combination of the adaptive beam forming sections 106d-1 to 106d-L, the weight controller 123b, and the adder 107. The interference quantity estimating section 129 and the normalizing section 130 in the adaptive beam forming sections 106d-1 to 106d-L operate in the same manner as in the second embodiment, to estimate the interference quantity, using the pilot symbol in the slot.

As described above, in this embodiment, an effect similar to that of the fourth embodiment can be obtained, and further, since the construction is such that normalization is performed for each path according to the interference quantity, for example, even when the interference quantity is different for each of the formed adaptive beams, the reception SIR can be increased.

As explained above, according to the present invention, the adaptive algorithm is operated, by using predetermined fixed directional beams. Thereby, the interference quantity for each beam is reduced, to increase the SIR. As a result, there is the effect that the adaptive beams formed by the adaptive algorithm can be formed quickly. Further, the adaptive beam combined signal phase matched for each path is used, to form the adaptive beams for each path, by using the adaptive algorithm. As a result, the communication quality can be increased, while reducing the influences of fading fluctuation and interference received in the area to be serviced.

According to the next invention, when a mobile station having a different transmission signal power exists, because the position of the mobile station is unevenly distributed momentarily, or the transmission rate is different, and hence the interference power for each beam formed by the adaptive array antennas cannot be regarded as the same, weighting is performed corresponding to the interference quantity, and then the adaptive beam combined signals for each path are combined. As a result, the reception SIR can be maximized, and hence ideal channel capacity can be obtained.

According to the next invention, at the time of path detection, a plurality of beams having predetermined directivity is used to cover the serviceable area, and path detection is performed for each of the fixed directional beams. As a result, even when the interference quantity is large in the area to be serviced, the interference power is suppressed for each of the fixed directional beams, and hence path detection can be accurately performed.

According to the next invention, a signal obtained by combining the adaptive beam combined signals phase matched for each path over all paths is used, to generate a weight common to all paths by using the adaptive algorithm. Thereby, on the reception side of the base station, one adaptive algorithm corresponding to the number of fixed directional beams needs only to be prepared. As a result, the size of hardware and software can be considerably reduced.

According to the next invention, when the path detection position is largely different spatially, an adequate adaptive beam is formed for each group of paths detected at close positions spatially. As a result, adaptive beams can be formed without increasing the number of the adaptive algorithm.

According to the next invention, since the construction is such that normalization is performed for each path, for example, even when the interference quantity is different for each of the formed adaptive beams, the reception SIR can be increased.

According to the next invention, at the time of path detection, a plurality of beams having predetermined directivity is used to cover the serviceable area, and path detection is performed for each of the fixed directional beams. As a result, even when the interference quantity is large in the area to be serviced, the interference power is suppressed for each of the fixed directional beams, and hence path detection can be accurately performed.

According to the next invention, when the weight is in the initial state, and when the adaptive algorithm of the adaptive antenna is in the initial state, the path detected for each of the fixed directional beams is weighted corresponding to the signal level, and combined. As a result, the time required until the beams are formed and the adaptive algorithm is settled can be reduced.

INDUSTRIAL APPLICABILITY

As described above, the adaptive antenna receiver according to the present invention is suitable for a mobile communication system adopting the CDMA system using the spread spectrum modulation system, and is useful for a transmission line of frequency selective fading, in which multipath waves interfere with each other due to reflection, diffraction, and scattering of radio waves resulting from the surrounding buildings and geographical features.

What is claimed is:

1. An adaptive antenna receiver comprising:
   a beam forming unit that uses a plurality of antennas to forms beams having fixed directivity;
   a plurality of despreading units that separately despread a beam signal corresponding to the beams having fixed directivity;
   a path detecting unit that detects multipath waves on a transmission line based on the signals obtained by despreding, and outputs path position information as a detection result;
   a transmission line estimating unit that estimates a transmission line for transmitting an adaptive beam combined signal for each path, based on the path position information;
   a plurality of complex multiplication units each of which separately complex multiplies the despread signals by the transmission line estimation result for each path;
   an adaptive beam forming unit that generates a weight for each path by operating an adaptive algorithm for each path, using a plurality of complex multiplication results and data judgment results in each path, and forms an adaptive beam combined signal for each path, using the weight and the despread signals;
   a phase matching unit that performs phase matching corresponding to the transmission line estimated by the transmission line estimating unit, using the adaptive beam signal for each path;
   a path combining unit that combines the adaptive beam signals after phase matching for all paths; and
   a data judging unit that judges the data included in the adaptive beam signals combined.

2. The adaptive antenna receiver according to claim 1, further comprising:
   an interference quantity estimating unit that estimates an interference quantity from the adaptive beam combined signal for each path, based on a known sequence added to a transmission slot; and
   a normalizing unit that normalizes the adaptive beam signal after phase matching, based on the estimated interference quantity for each path,
   wherein the path combining unit combines the adaptive beam signals after phase matching normalization for all paths.

3. The adaptive antenna receiver according to claim 1, wherein
   the path detecting unit includes
      a plurality of each beam path detecting units each of which uses the signal after despreading for each beam to obtain a path position and a path power value separately; and
      a path selecting section that selects a predetermined number of paths in decreasing order of path power value, from paths having different path positions, and outputs path position information as a selection result, and
   each of the each beam path detecting units includes
      an in-phase addition unit that in-phase adds all symbols in one slot, by using a known sequence provided for each slot of the despread signal for each beam;
      a mean power delay profile unit that performs averaging processing of power over several slots by using the in-phase addition result, to generate a mean power delay profile;
      a threshold generating unit that generates a threshold for selecting a path, based on the mean power delay profile; and
      a comparison unit that compares the mean power delay profile with the threshold, and outputs a path position of a path exceeding the threshold and the path power value.

4. The adaptive antenna receiver according to claim 1, wherein when the adaptive algorithm is in an initial state, the adaptive beam forming unit sets the weight to 1 with respect to the beam for which a path has been detected, and sets the weight to 0 with respect to other beams.

5. An adaptive antenna receiver comprising:

a beam forming unit that uses a plurality of antennas to form beams having fixed directivity;

a plurality of despreading units that separately despread a beam signal corresponding to the beams having fixed directivity;

a path detecting unit that detects multipath waves on a transmission line based on the signals obtained by despreding, and outputs path position information and predetermined beam selection information necessary for operating an adaptive algorithm as a detection result;

a transmission line estimating unit that estimates the transmission line for transmitting an adaptive beam combined signal for each path, based on the path position information;

a plurality of complex multiplication units each of which separately complex multiplies the despread signal by the transmission line estimation result for each path;

an adaptive beam forming unit that generates a weight common to all paths by operating one adaptive algorithm, using the complex multiplication results, data judgment results, and the beam selection information for all paths, and forms an adaptive beam combined signal for each path, using the weight common to all paths and the despread signals;

a phase matching unit that performs phase matching corresponding to the transmission line estimated by the transmission line estimating unit, using the adaptive beam signal for each path;

a path combining unit that combines the adaptive beam signals after phase matching for all paths; and a data judging unit that judges the data included in the adaptive beam signals combined.

6. The adaptive antenna receiver according to claim 5, further comprising:

a plurality of adaptive beam forming groups formed of a combination of the transmission line estimating unit, the complex multiplication unit, the adaptive beam forming unit, the phase matching unit, and the path combining unit; and a group combining unit that combines outputs from the adaptive beam forming groups, wherein the data judging unit judges the data included in the signal output from the group combining unit.

7. The adaptive antenna receiver according to claim 5, further comprising:

a plurality of adaptive beam forming groups formed of a combination of the transmission line estimating unit, the complex multiplication unit, the adaptive beam forming unit, the phase matching unit, an interference quantity estimating unit that estimates the interference quantity from the adaptive beam combined signal for each path based on a known sequence added to the transmission slot, a normalizing unit that normalizes the adaptive beam signal after phase matching, based on the interference quantity estimated for each path, and a path combining unit that further combines the outputs from the adaptive beam forming groups, wherein the data judging unit judges the data included in the signal output from the group combining unit.

8. The adaptive antenna receiver according to claim 5, wherein the path detecting unit includes a plurality of each beam path detecting units each of which uses the despread signal for each beam to obtain a path position and a path power value separately; and a path selecting section that selects a predetermined number of paths in decreasing order of path power value, from paths having different path positions, and outputs path position information as a selection result, and each of the each beam path detecting units includes an in-phase addition unit that in-phase adds all symbols in one slot, by using a known sequence provided for each slot of the despread signal for each beam;

a mean power delay profile unit that performs averaging processing of power over several slots by using the in-phase addition result, to generate a mean power delay profile;

a threshold generating unit that generates a threshold for selecting a path, based on the mean power delay profile;

a comparison unit that compares the mean power delay profile with the threshold, and outputs a path position of a path exceeding the threshold and the path power value; and a beam selection information generating unit that calculates the sum total of the path power for each beam based on the path position and the path power value, and selects a beam having the largest sum total, to generate beam selection information as a selection result.

9. The adaptive antenna receiver according to claim 5, wherein when the adaptive algorithm is in an initial state, the adaptive beam forming unit sets the weight to 1 with respect to the beam for which a path has been detected, and sets the weight to 0 with respect to other beams.

* * * * *